US012663595B2

(12) United States Patent
Liu et al.

(10) Patent No.: US 12,663,595 B2
(45) Date of Patent: Jun. 23, 2026

(54) SEMICONDUCTOR PHOTONICS DEVICE AND METHODS OF FORMATION FOR SPECIFIC PHOTONICS CONSTRUCTION AND STRUCTURE

(71) Applicant: Taiwan Semiconductor Manufacturing Company, Ltd., Hsinchu (TW)

(72) Inventors: Po-Chun Liu, Hsinchu City (TW); Chih-Ming Chen, Hsinchu City (TW); Ru-Liang Lee, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 389 days.

(21) Appl. No.: 18/524,548

(22) Filed: Nov. 30, 2023

(65) Prior Publication Data

US 2025/0180833 A1 Jun. 5, 2025

(51) Int. Cl.
*G02B 6/42* (2006.01)

(52) U.S. Cl.
CPC .................................. *G02B 6/4214* (2013.01)

(58) Field of Classification Search
CPC .......... G02B 6/4214; G02B 6/30; G02B 6/34; G02B 2006/12142
See application file for complete search history.

(56) References Cited

U.S. PATENT DOCUMENTS

| | | | |
|---|---|---|---|
| 6,684,007 B2 * | 1/2004 | Yoshimura | .............. H01L 24/82 |
| | | | 257/E25.032 |
| 9,341,773 B2 | 5/2016 | Dutta | |
| 10,054,737 B2 | 8/2018 | Kobrinsky et al. | |
| 10,209,442 B2 * | 2/2019 | Menezo | ................ G02B 6/4214 |
| 10,705,302 B2 * | 7/2020 | Ji | ............................. G02B 6/30 |
| 11,069,830 B1 | 7/2021 | Pawlak et al. | |
| 11,531,171 B2 * | 12/2022 | Menezo | ................ G02B 6/4206 |
| 12,455,420 B2 * | 10/2025 | Yu | ............................. G02B 6/13 |
| 2002/0028045 A1 * | 3/2002 | Yoshimura | .............. H01L 24/82 |
| | | | 385/39 |
| 2005/0286602 A1 * | 12/2005 | Gunn | ................. G02B 6/12007 |
| | | | 372/50.1 |
| 2018/0335566 A1 * | 11/2018 | Menezo | ................... G02B 6/34 |
| 2019/0265421 A1 * | 8/2019 | Ji | ......................... G02B 6/4214 |

(Continued)

FOREIGN PATENT DOCUMENTS

| | | |
|---|---|---|
| TW | I610103 B | 1/2018 |
| TW | I781650 B | 10/2022 |

*Primary Examiner* — Andrew Jordan
(74) *Attorney, Agent, or Firm* — Harrity & Harrity, LLP

(57) ABSTRACT

A semiconductor photonics device may include a photonic integrated circuit and may be coupled with an output optical fiber at a top surface of the semiconductor photonics device. To facilitate coupling of modulated optical signals to the output optical fiber at the top surface of the semiconductor photonics device, the semiconductor photonics device may include a mirror structure that is supported by a semiconductor support structure included in the semiconductor photonics device. The mirror structure may be positioned at an angle relative to a surface of a semiconductor substrate of the semiconductor photonics device, which enables the mirror structure to transfer a modulated optical signal propagating in a first direction to a second direction toward the output optical fiber.

20 Claims, 23 Drawing Sheets

200

(56)     References Cited

U.S. PATENT DOCUMENTS

| 2021/0333491 A1* | 10/2021 | Menezo | G02B 6/34 |
| 2022/0043208 A1 | 2/2022 | Hsia et al. | |
| 2022/0382003 A1* | 12/2022 | Yu | G02B 6/136 |
| 2024/0361520 A1* | 10/2024 | Yu | G02B 6/136 |
| 2025/0180833 A1* | 6/2025 | Liu | G02B 6/30 |
| 2025/0244543 A1* | 7/2025 | Chen | G02B 6/4214 |
| 2025/0389891 A1* | 12/2025 | Chen | G02B 6/1228 |

* cited by examiner

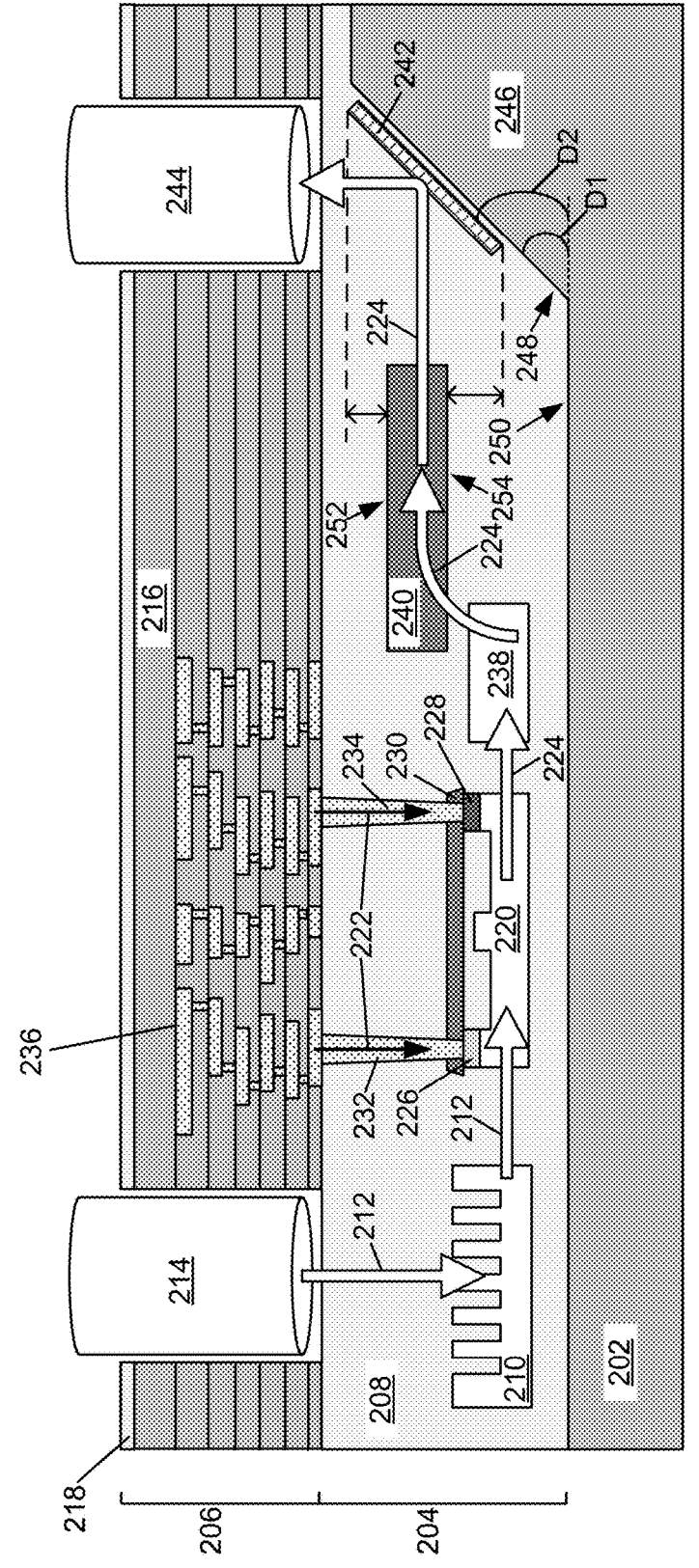
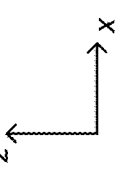
FIG. 2

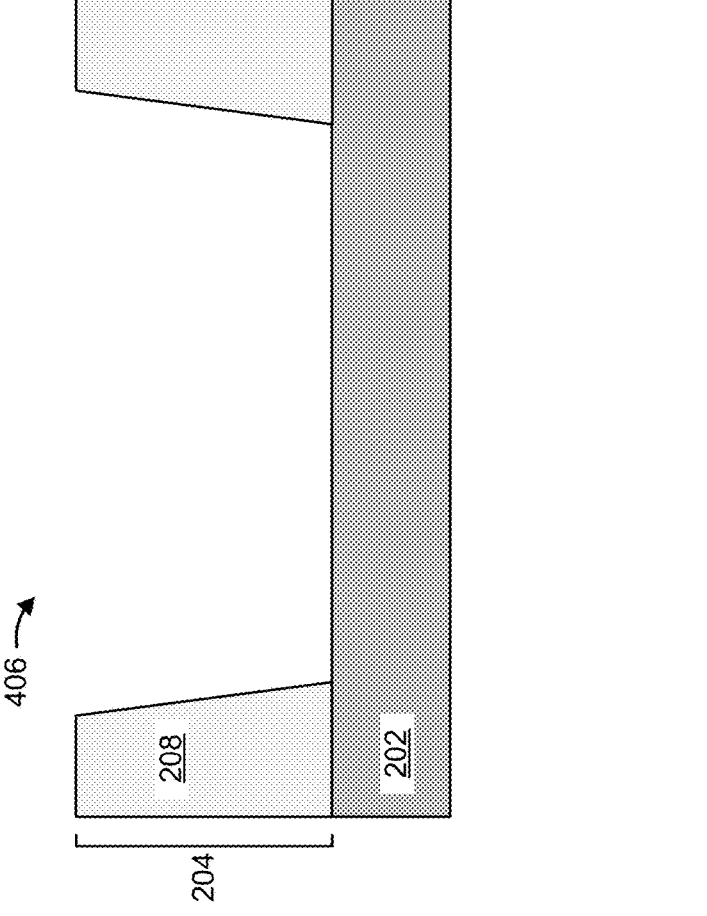
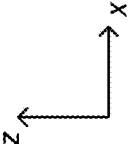
FIG. 4I

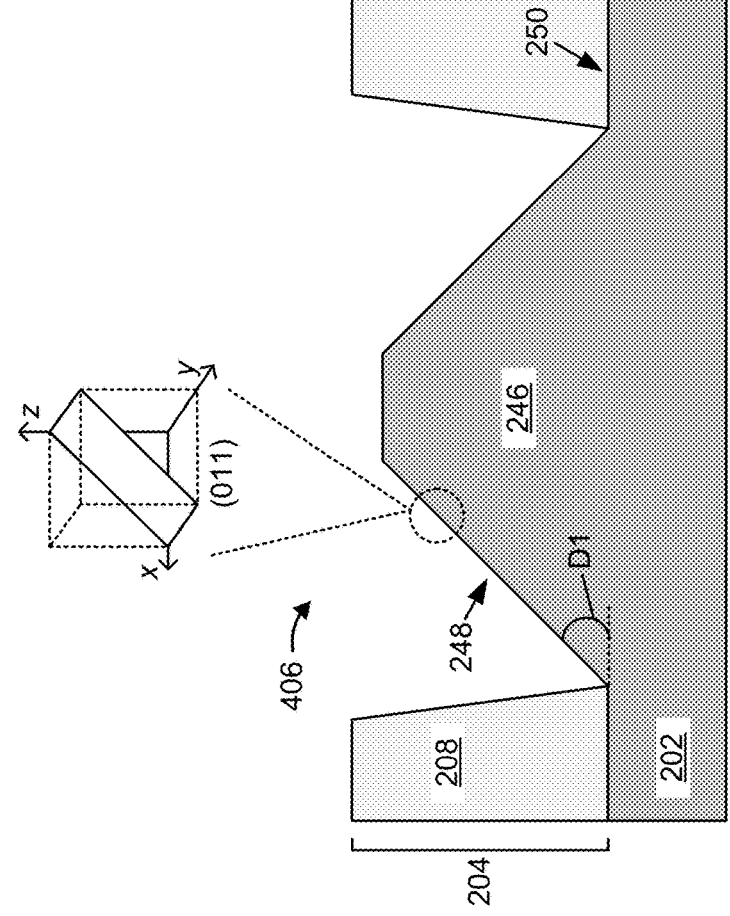
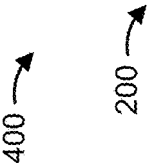
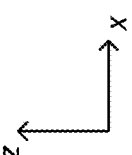
FIG. 4J

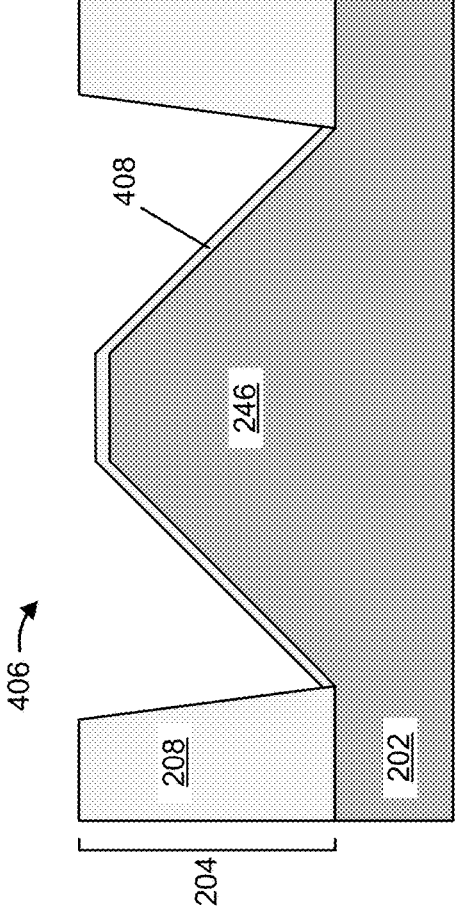
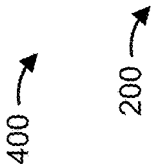
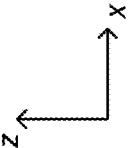
FIG. 4K

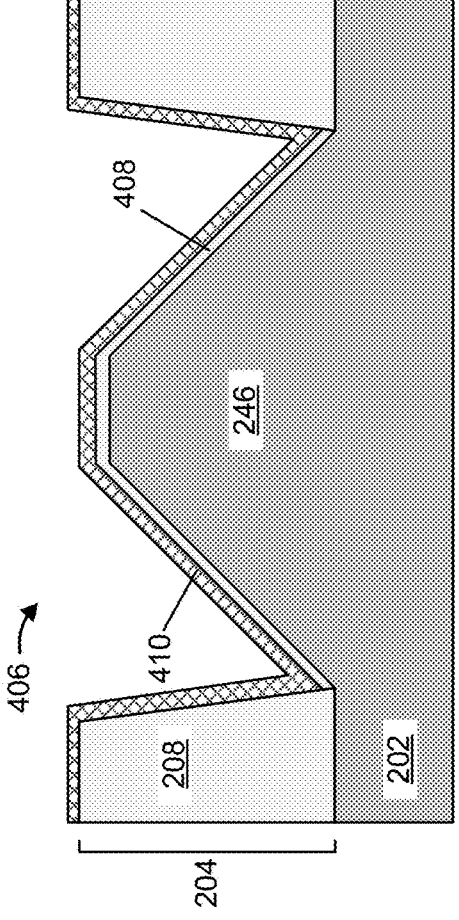
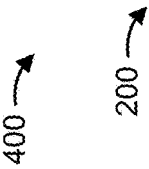
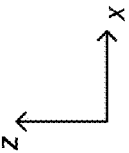
FIG. 4L

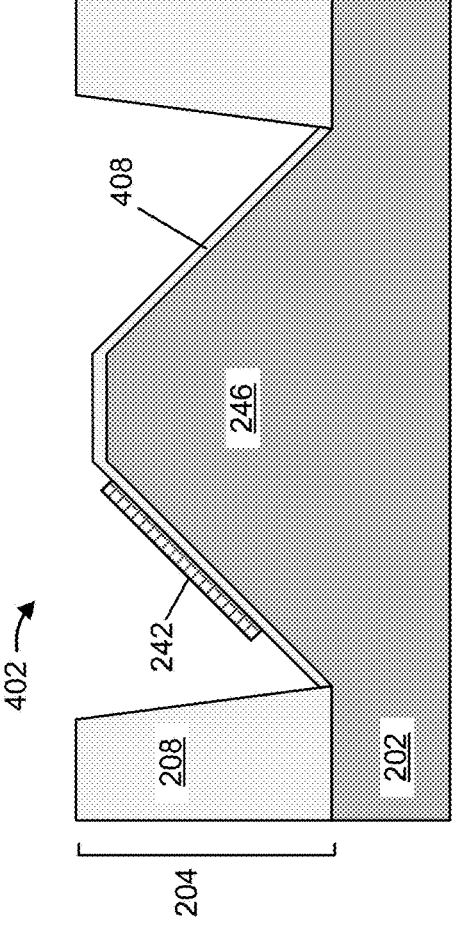
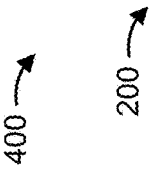
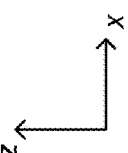
FIG. 4M

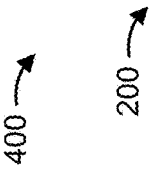
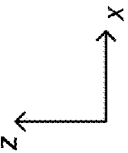
FIG. 4N

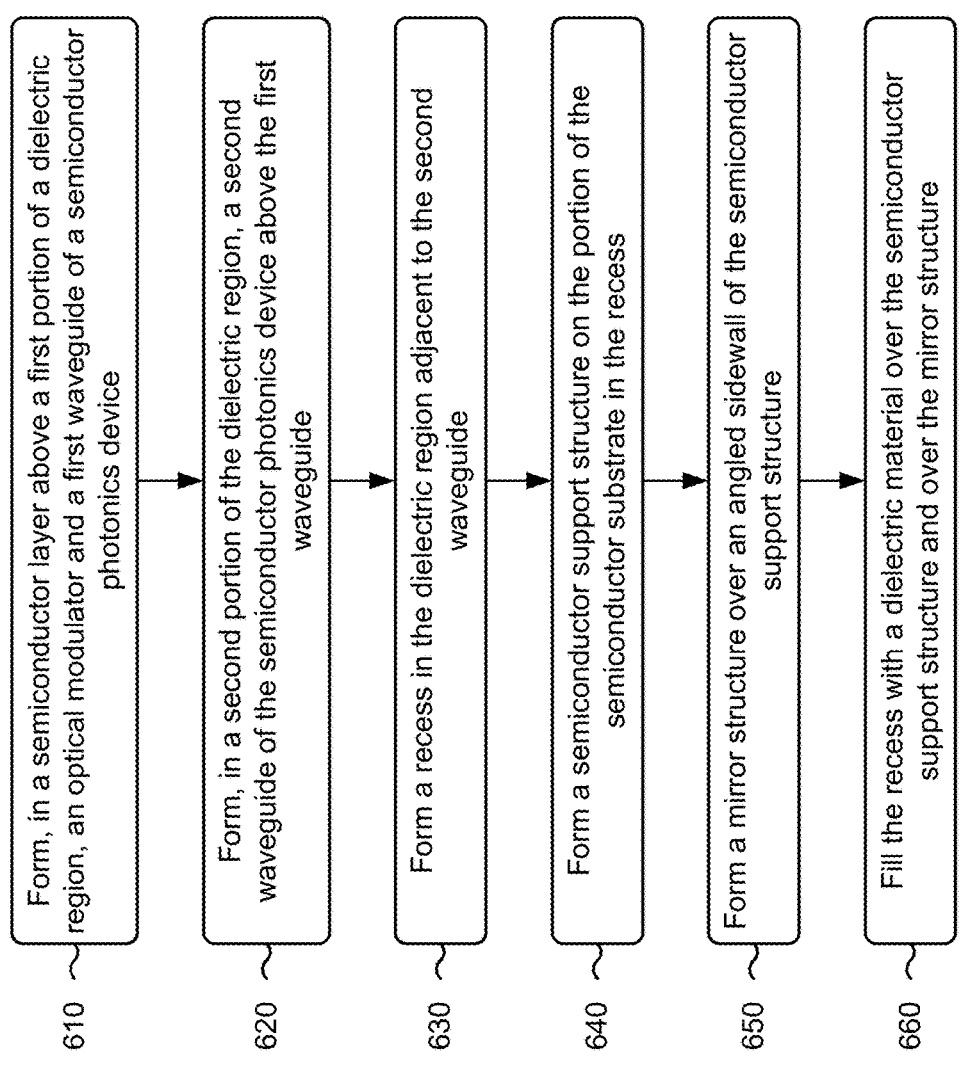

610 — Form, in a semiconductor layer above a first portion of a dielectric region, an optical modulator and a first waveguide of a semiconductor photonics device 620 — Form, in a second portion of the dielectric region, a second waveguide of the semiconductor photonics device above the first waveguide 630 — Form a recess in the dielectric region adjacent to the second waveguide 640 — Form a semiconductor support structure on the portion of the semiconductor substrate in the recess 650 — Form a mirror structure over an angled sidewall of the semiconductor support structure 660 — Fill the recess with a dielectric material over the semiconductor support structure and over the mirror structure

SEMICONDUCTOR PHOTONICS DEVICE AND METHODS OF FORMATION FOR SPECIFIC PHOTONICS CONSTRUCTION AND STRUCTURE

BACKGROUND

A semiconductor device may be configured to use optical signals for high speed and secure data transmission. An optical signal may be transferred through a waveguide in the semiconductor device. The waveguide enables confinement of the optical signal, which may reduce optical loss and increase propagation efficiency for the optical signal. Data may be encoded into an optical signal by modulating light into optical pulses through an optical modulator. The optical pulses are then transferred to the waveguide for propagation to other regions of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram of an example semiconductor photonics device described herein.

FIG. 6 is a flowchart of an example process associated with forming a semiconductor photonics device described herein.

DETAILED DESCRIPTION

Figure 1:
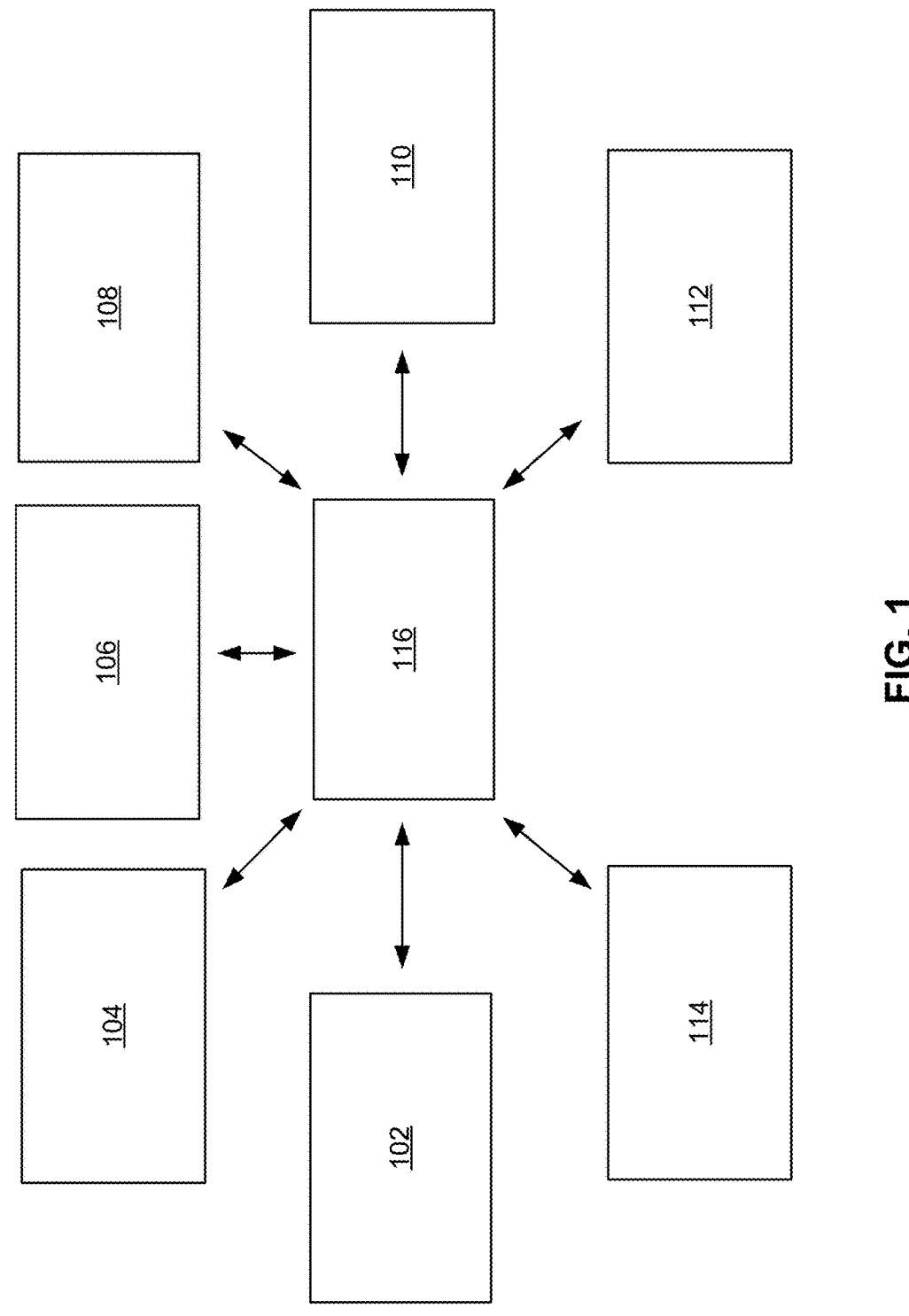
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An optical modulator of a photonic integrated circuit may be configured to receive an input optical signal and an input electrical signal, and may be configured to encode data from the input electrical signal onto the input optical signal by modulating the input optical signal to generate a modulated optical signal. A waveguide of the photonic integrated circuit may be configured to receive the modulated optical signal and provide the modulated optical signal to an output optical fiber on which the modulated optical signal is transmitted to another device. In this way, the photonic integrated circuit may facilitate high-speed and/or high-bandwidth optical communications for applications such as telecommunications, data center, and/or high performance compute (HPC), among other examples.

In some implementations described herein, a semiconductor photonics device may include a photonic integrated circuit and may be coupled with an output optical fiber at a top surface of the semiconductor photonics device. To facilitate coupling of modulated optical signals to the output optical fiber at the top surface of the semiconductor photonics device, the semiconductor photonics device may include a mirror structure that is supported by a semiconductor support structure included in the semiconductor photonics device. The mirror structure may be positioned at an angle relative to a surface of a semiconductor substrate of the semiconductor photonics device, which enables the mirror structure to transfer a modulated optical signal propagating in a first direction to a second direction toward the output optical fiber.

Coupling the output optical fiber to the top surface of the semiconductor photonics device, as opposed to coupling the output optical fiber to a side surface of the semiconductor photonics device, enables wafer-level testing for the semiconductor photonics device. In other words, the semiconductor photonics device may be operated and tested as a part of a semiconductor wafer prior to the semiconductor wafer being diced into individual semiconductor photonics devices. This enables enhanced inspection and verification of the performance of the semiconductor photonics device, and may enable increased yield of semiconductor photonics devices on a semiconductor wafer to be achieved. Moreover, propagation distances for modulated optical signals in the semiconductor photonics device may be reduced by coupling the output optical fiber to the top surface of the semiconductor photonics device, as opposed to coupling the output optical fiber to a side surface of the semiconductor photonics device. Accordingly, coupling the output optical fiber to the top surface of the semiconductor photonics device may reduce optical loss in the semiconductor photonics device and/or may increase the operating efficiency of the semiconductor photonics device, among other examples.

FIG. 1 is a diagram of an example environment 100 in which systems and/or methods described herein may be implemented. As shown in FIG. 1, the example environment 100 may include a plurality of semiconductor processing tools 102-114 and a wafer/die transport tool 116. The plurality of semiconductor processing tools 102-114 may include a deposition tool 102, an exposure tool 104, a developer tool 106, an etch tool 108, a planarization tool 110, a plating tool 112, an ion implantation tool 114, and/or another type of semiconductor processing tool. The tools included in example environment 100 may be included in a semiconductor clean room, a semiconductor foundry, a semiconductor processing facility, and/or manufacturing facility, among other examples.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma enhanced CVD (PECVD) tool, a low-pressure CVD (LPCVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the example environment 100 includes a plurality of different types of deposition tools 102. "Deposition tool 102," as used herein, may refer to one or more deposition tools 102, one or more of the same type of deposition tools 102, and/or one or more different types of deposition tools 102, among other examples.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or the like. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or the like. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The ion implantation tool 114 is a semiconductor processing tool that is capable of implanting ions into a substrate. The ion implantation tool 114 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The wafer/die transport tool 116 may be included in a cluster tool or another type of tool that includes a plurality of processing chambers, and may be configured to transport substrates and/or semiconductor devices between the plurality of processing chambers, to transport substrates and/or semiconductor devices between a processing chamber and a buffer area, to transport substrates and/or semiconductor devices between a processing chamber and an interface tool such as an equipment front end module (EFEM), and/or to transport substrates and/or semiconductor devices between a processing chamber and a transport carrier (e.g., a front opening unified pod (FOUP)), among other examples. In some implementations, a wafer/die transport tool 116 may be included in a multi-chamber (or cluster) deposition tool 102, which may include a pre-clean processing chamber (e.g., for cleaning or removing oxides, oxidation, and/or other types of contamination or byproducts from a substrate and/or semiconductor device) and a plurality of types of deposition processing chambers (e.g., processing chambers for depositing different types of materials, processing chambers for performing different types of deposition operations).

In some implementations, one or more of the semiconductor processing tools 102-114 may perform one or more semiconductor processing operations described herein. For example, one or more of the semiconductor processing tools 102-114 may form, in a semiconductor layer above a first portion of a dielectric region, an optical modulator and a first waveguide of a semiconductor photonics device; may form, in a second portion of the dielectric region, a second waveguide of the semiconductor photonics device above the first waveguide; may form a recess in the dielectric region adjacent to the second waveguide, where a portion of a semiconductor substrate below the dielectric region is exposed through the recess; may form a semiconductor support structure on the portion of the semiconductor substrate in the recess; may form a mirror structure over an angled sidewall of the semiconductor support structure; and/or may fill the recess with a dielectric material over the semiconductor support structure and over the mirror structure, among other examples. One or more of the semiconductor processing tools 102-114 may perform other semiconductor processing operations described herein, such as in connection with FIGS. 4A-4Q and/or 6, among other examples.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example environment 100 may perform one or more functions described as being performed by another set of devices of the example environment 100.

FIG. 2 is a diagram of an example semiconductor photonics device 200 described herein. The semiconductor photonics device 200 may include a photonics integrated circuit (PIC) that is configured to transmit and/or receive modulated optical signals (e.g., an optical signal that is modulated to encode data in the optical signal). In general, the semiconductor photonics device 200 may be configured to convert between electrical signals and optical signals for high-bandwidth optical communications.

FIG. 2 illustrates a cross-sectional view of the semiconductor photonics device 200. As shown in FIG. 2, the semiconductor photonics device 200 may include a semiconductor substrate 202, a device region 204 above the semiconductor substrate 202, and an interconnect region 206 above the device region 204. The semiconductor substrate 202 may include a silicon (Si) substrate and/or another type of semiconductor substrate. The device region 204 may include a dielectric region 208. The dielectric region 208 may include one or more layers of dielectric material. The dielectric material may include a silicon oxide ($SiO_x$), a silicon nitride (SixNy), a silicon oxynitride (SiON), tetraethyl orthosilicate oxide, phosphosilicate glass (PSG), borophosphosilicate glass (BPSG), fluorinated silicate glass (FSG), carbon doped silicon oxide, and/or another dielectric material.

The device region 204 may further include a grating coupler 210 in the dielectric region 208. The grating coupler 210 may include a semiconductor structure (e.g., a silicon (Si) structure and/or other types of semiconductor structure) that are configured to receive an input optical signal 212 from an input optical fiber 214 that extends through one or more dielectric layers 216 in the interconnect region 206 of the semiconductor photonics device 200. The grating coupler 210 may direct the input optical signal 212 toward an optical modulator 220 included in the dielectric region 208 of the device region 204. The grating coupler 210 may be configured to diffract the input optical signal 212 from an off-plane direction (e.g., a z-direction) in the semiconductor photonics device 200 to an in-plane direction (e.g., an x-direction) that is in the plane of the optical modulator 220. The grating coupler 210 may include a plurality of periodic gratings. The periodicity of the periodic gratings may be selected to achieve diffraction of one or more wavelengths of the input optical signal 212. In some implementations, the periodicity of the periodic gratings may be selected based on the wavelength of the input optical signal 212.

The one or more dielectric layers 216 of the interconnect region 206 may include one or more layers of dielectric material. The dielectric material may include a silicon oxide ($SiO_x$), a silicon nitride (SixNy), a silicon oxynitride (SiON), tetraethyl orthosilicate oxide, phosphosilicate glass (PSG), borophosphosilicate glass (BPSG), fluorinated silicate glass (FSG), carbon doped silicon oxide, and/or another dielectric material. A passivation layer 218 may be included over and/or on the one or more dielectric layers 216, and the passivation layer 218 may include one or more dielectric materials, one or more polymer materials, and/or one or more materials of another type.

The optical modulator 220 may include a micro-ring modulator (MRM), a Mach Zender modulator (MZM), and/or another type of optical modulator that is configured to modulate the input optical signal 212, based on an input electrical signal 222, to generate a modulated optical signal 224. The input electrical signal 222 may be or may correspond to a stream of digital data (e.g., 1-values and 0-values). The optical modulator 220 may modulate the amplitude of the input optical signal 212, the phase of the input optical signal 212, the frequency of the input optical signal 212, and/or another property of the input optical signal 212 based on the stream of digital data of the input electrical signal 222.

The input electrical signal 222 may be provided to contacts 226 and/or 228 of the optical modulator 220. The contacts 226 and/or 228 may include one or more types of doped semiconductor materials. For example, the contact 226 may be a p-doped contact (e.g., may include a semiconductor material that is doped with one or more p-type dopants), and the contact 228 may be an n-doped contact (e.g., may include a semiconductor material that is doped with one or more n-type dopants). Thus, the optical modulator 220 may include a P-N junction. The semiconductor material may include silicon (Si), germanium (Ge), silicon germanium (SiGe), and/or another semiconductor material. The p-type dopant(s) may include p-type ions of a p-type material (e.g., boron (B) or germanium (Ge), among other examples). The n-type dopant(s) may include n-type ions of an n-type material (e.g., phosphorous (P) or arsenic (As), among other examples).

When the input electrical signal 222 is applied to the P-N junction of the optical modulator 220, a junction depletion width of the P-N junction is modified. This results in changes in concentrations of electrons and holes within the optical modulator 220. The changes in concentrations of electrons and holes may lead to changes of the effective refractive index of the optical modulator 220, which may modulate the light intensity of the input optical signal 212 within the optical modulator 220, thereby enabling the input electrical signal 222 to be translated to the modulated optical signal 224.

A capping layer 230 may be included over and/or on the contacts 226 and 228. The capping layer 230 may include one or more dielectric materials, such as a silicon oxide ($SiO_x$), a silicon nitride (SixNy), a silicon oxynitride (SiON), tetraethyl orthosilicate oxide, phosphosilicate glass (PSG), borophosphosilicate glass (BPSG), fluorinated silicate glass (FSG), carbon doped silicon oxide, and/or another dielectric material.

The device region 204 may include a plurality of interconnect structures 232 and 234 that are included in the dielectric region 208 and coupled with the optical modulator 220. For example, the interconnect structure 232 may be electrically coupled and/or physically coupled with the contact 226, and the interconnect structure 234 may be electrically coupled and/or physically coupled with the contact 228. The interconnect structures 232 and 234 may each include one or more electrically conductive materials, such as tungsten (W), cobalt (Co), ruthenium (Ru), titanium (Ti), aluminum (Al), copper (Cu), and/or gold (Au), among other examples of conductive materials. The interconnect structures 232 and 234 may each include vias, trenches, contact plugs, and/or another type of conductive structures.

The interconnect structures 232 and 234 may be electrically coupled and/or physically coupled with one or more metallization layers 236 in the one or more dielectric layers 216 of the interconnect region 206 of the semiconductor photonics device 200. The input electrical signal 222 may be provided to the optical modulator 220 through the metallization layer(s) 236 and through the interconnect structures 232 and 234. The metallization layer(s) 236 correspond to circuitry that enables signals and/or power to be provided to and/or from the optical modulator 220 and/or other devices in the device region 204. The metallization layer(s) 236 may each include one or more electrically conductive materials, such as tungsten (W), cobalt (Co), ruthenium (Ru), titanium (Ti), aluminum (Al), copper (Cu), and/or gold (Au), among other examples of conductive materials. The metallization layer(s) 236 may each include vias, trenches, contact plugs, conductive pads, conductive pillars, and/or another type of metallization layers.

The optical modulator 220 may be configured to provide the modulated optical signal 224 to a semiconductor waveguide 238 included in the dielectric region 208 of the device region 204. The semiconductor waveguide 238 may include a silicon (Si) waveguide and/or another type of semiconductor waveguide. The semiconductor waveguide 238 may be configured to receive the modulated optical signal 224 and to transfer the modulated optical signal 224 to a dielectric waveguide 240 located above the semiconductor waveguide 238 in the dielectric region 208 of the device region 204. The semiconductor waveguide 238 may be manufactured from the same semiconductor layer as the optical modulator 220 and/or as the grating coupler 210, as described in connection with FIGS. 4A-4Q.

The dielectric waveguide 240 may include a slab waveguide that includes a plurality of dielectric layers. The dielectric waveguide 240 may include a high dielectric constant (high-k) core layer that is sandwiched between low dielectric constant (low-k) cladding layers. This enables the modulated optical signal 224 to be loosely confined within the high-k core layer and to achieve total internal reflections of the modulated optical signal 224 in the high-k dielectric core layer, which may enable low optical loss and/or increased signal propagation speeds relative to the semiconductor waveguide 238. The low-k dielectric cladding layers may each include a low-k dielectric material, such as a silicon oxide ($SiO_x$ such as $SiO_2$), that has a dielectric constant included in a range of approximately 3.9 to approximately 4.2. The high-k dielectric core layer may include a high-k dielectric material that has a dielectric constant greater than 4.2 and included in a range of approximately 7 to approximately 1500. However, other values for the ranges of the dielectric constants of the low-k dielectric cladding layers and the high-k dielectric core layer are within the scope of the present disclosure. Examples of high-k dielectric materials that may be used for the high-k dielectric core layer include a strontium titanate ($SrTiO_x$ such as $SrTiO_3$), a barium titanate ($BaTiO_x$ such as $BaTiO_3$), a barium strontium Titanate ($BaSrTiO_x$ such as $BaSrTiO_3$), a lead zirconate titanate ($PbZrTiO_x$ such as $PbZrTiO_3$), a silicon nitride ($Si_xN_y$ such as $Si_3N_4$), a titanium dioxide ($TiO_x$ such as $TiO_2$), a zirconium oxide ($ZrO_x$ such as $ZrO_2$), an aluminum oxide ($Al_xO_y$ such as $Al_2O_3$), a hafnium oxide ($HfO_x$ such as $HfO_2$), a hafnium silicate ($HfSiO_x$ such as $HfSiO_4$), a zirconium titanate ($ZrTiO_x$ such as $ZrTiO_4$), a tantalum oxide ($Ta_xO_y$ such as $Ta_2O_5$), and/or a yttrium oxide ($Y_xO_y$ such as $Y_2O_3$), among other examples.

The dielectric waveguide 240 may direct the modulated optical signal 224 toward a mirror structure 242 included in the dielectric region 208 of the device region 204 above the semiconductor substrate 202. The mirror structure 242 may be configured to redirect the modulated optical signal 224 from propagation in the x-direction (e.g., a first direction that is approximately parallel with the semiconductor substrate 202) in the semiconductor photonics device 200 to the z-direction (e.g., a second direction that is approximately perpendicular to the first direction) in the semiconductor photonics device 200. This enables the mirror structure to direct the modulated optical signal 224 toward an output optical fiber 244 that is coupled with the semiconductor photonics device 200 at the top of the semiconductor photonics device 200 (e.g., as opposed to at a side of the semiconductor photonics device 200).

The mirror structure 242 being configured to direct the modulated optical signal 224 toward the top surface of the semiconductor photonics device 200 (e.g., instead of a side surface of the semiconductor photonics device 200) enables the semiconductor photonics device 200 to be subjected to wafer-level testing prior to the semiconductor photonics device 200 being cut or diced from a semiconductor wafer on which the semiconductor photonics device 200 is manufactured. Prior to the semiconductor photonics device 200 being cut or diced from the semiconductor wafer, the sides of the semiconductor photonics device 200 are adjoined with other semiconductor dies on the semiconductor wafer. Therefore outputs from the photonic integrated circuit of the semiconductor photonics device 200 (e.g., which includes the optical modulator 220 and the waveguides 238 and 240) cannot be obtained through the side of the semiconductor photonics device 200 prior to semiconductor photonics device 200 being cut or diced from the semiconductor wafer. The mirror structure 242 being configured to direct the modulated optical signal 224 toward the top surface of the semiconductor photonics device 200 enables the semiconductor photonics device 200 to be subjected to wafer-level testing through the top surface of the semiconductor photonics device 200 prior to the semiconductor photonics device 200 being cut or diced from the semiconductor wafer. For example, the semiconductor photonics device 200 may be subjected to wafer-level testing to verify the operation of the optical modulator 220 and/or the waveguides 238 and 240. Examples include verifying the optical intensity of modulated optical signals 224 generated by the optical modulator 220, verifying the operating frequency of modulated optical signals 224 generated by the optical modulator 220, and/or verifying an error rate of data encoded in modulated optical signals 224 generated by the optical modulator 220, among other examples.

Additionally, and/or alternatively, the propagation distance for modulated optical signals 224 from the dielectric waveguide 240 to the top surface of the semiconductor photonics device 200 may be lesser than the propagation distance for modulated optical signals 224 from the dielectric waveguide 240 to a side surface of the semiconductor photonics device 200. Accordingly, the mirror structure 242 being configured to direct the modulated optical signal 224 toward the top surface of the semiconductor photonics device 200 may reduce optical loss for modulated optical signals 224 in the semiconductor photonics device 200 (which may reduce the operating power consumption of the semiconductor photonics device 200) and/or may enable the semiconductor photonics device 200 to operate at higher data rates, among other examples.

The mirror structure 242 may be included over, and may be supported by, a semiconductor support structure 246. The semiconductor support structure 246 may be included on, and may extend above, the semiconductor substrate 202. In some implementations, the semiconductor support structure 246 and the semiconductor substrate 202 may both include the same semiconductor material such as silicon (Si). In some implementations, the semiconductor support structure 246 and the semiconductor substrate 202 may include different semiconductor materials.

The semiconductor support structure 246 may include an angled sidewall 248 that is angled relative to a top surface 250 of the semiconductor substrate 202. The mirror structure 242 may be located over the angled sidewall 248 of the semiconductor support structure 246, which enables the mirror structure 242 to be positioned at an angle (e.g., relative to the top surface 250 and relative to a propagation direction of the of modulated optical signal 224) that enables the mirror structure 242 to redirect the modulated optical signal 224 from propagation in the x-direction in the semiconductor photonics device 200 to propagation in the z-direction toward the top surface of the semiconductor photonics device 200 where the output optical fiber 244 is located.

A dimension D1 of the semiconductor support structure 246 may correspond to an angle of the angled sidewall 248 relative to the top surface 250 of the semiconductor substrate 202. A dimension D2 of the mirror structure 242 may correspond to an angle of the mirror structure 242 relative to the top surface 250 of the semiconductor substrate 202. In some implementations, the dimension D1 and the dimension D2 are approximately the same (e.g., within 5% difference, within 1% difference). In other words, the angle of the mirror structure 242 may correspond to an angle of the angled sidewall 248 of the semiconductor support structure 246. In some implementations, the dimension D1 and the dimension D2 are included in a range of approximately 40 degrees to approximately 50 degrees. If the dimension D1 and the dimension D2 are lesser than approximately 40 degrees or greater than approximately 50 degrees, the propagation distance for the modulated optical signal 224 may increase because the modulated optical signal 224 would otherwise propagate toward the top surface of the semiconductor photonics device 200 at an angle instead of directly in the z-direction. This may introduce additional optical loss for the modulated optical signal 224. However, other values for the dimension D1 and the dimension D2, and ranges other than approximately 40 degrees to approximately 50 degrees, are within the scope of the present disclosure.

As further shown in FIG. 2, the length of the mirror structure 242 may be selected such the mirror structure 242 fully covers the thickness of the dielectric waveguide 240. In other words, the length of the mirror structure 242 may be selected such that a top surface (or a top-most point) of the mirror structure 242 is located at a higher z-direction location in the semiconductor photonics device 200 than a top surface 252 of the dielectric waveguide 240, and such that a bottom surface (or a bottom-most point) of the mirror structure 242 is located at a lower z-direction location in the semiconductor photonics device 200 than a bottom surface 254 of the dielectric waveguide 240. If the mirror structure 242 did not fully extend between the top surface 252 and the bottom surface 254 of the dielectric waveguide 240, optical loss may be experienced for the modulated optical signal 224 and, therefore, reduced operating efficiency may be experienced for the semiconductor photonics device 200. The mirror structure 242 fully extending between the top surface 252 and the bottom surface 254 of the dielectric waveguide 240 may increase the likelihood that the mirror structure 242 fully captures the modulated optical signal 224 received from the dielectric waveguide 240, thereby minimizing optical loss of the modulated optical signal 224.

In this way, the semiconductor photonics device 200 may include the semiconductor substrate 202, the dielectric region 208 above the semiconductor substrate 202, and the optical modulator 220 in the dielectric region 208. The semiconductor photonics device 200 may include the semiconductor waveguide 238 adjacent to and optically coupled with the optical modulator 220, the dielectric waveguide 240 above and optically coupled with the semiconductor waveguide 238, and the mirror structure 242 adjacent to and optically coupled with the dielectric waveguide 240. The mirror structure 242 may be supported on the semiconductor support structure 246 that extends above the top surface 250 of the semiconductor substrate 202. The mirror structure 242 may be configured to receive the modulated optical signal 224 from the dielectric waveguide 240 and to direct the modulated optical signal 224 toward the output optical fiber 244 coupled with the semiconductor photonics device 200 at the top of the semiconductor photonics device 200.

As indicated above, FIG. 2 is provided as an example. Other examples may differ from what is described with regard to FIG. 2.

Figure 3A:
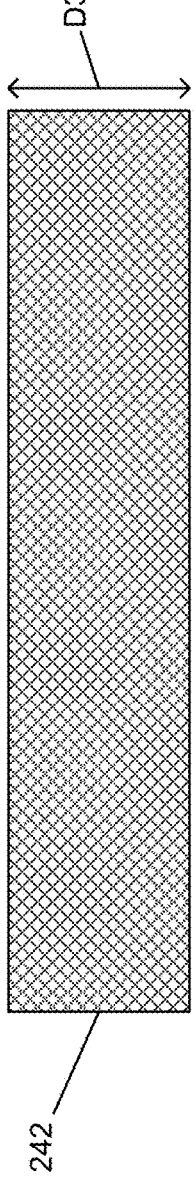
FIGS. 3A and 3B are diagrams of example implementations of the mirror structure described herein.
Figure 3B:
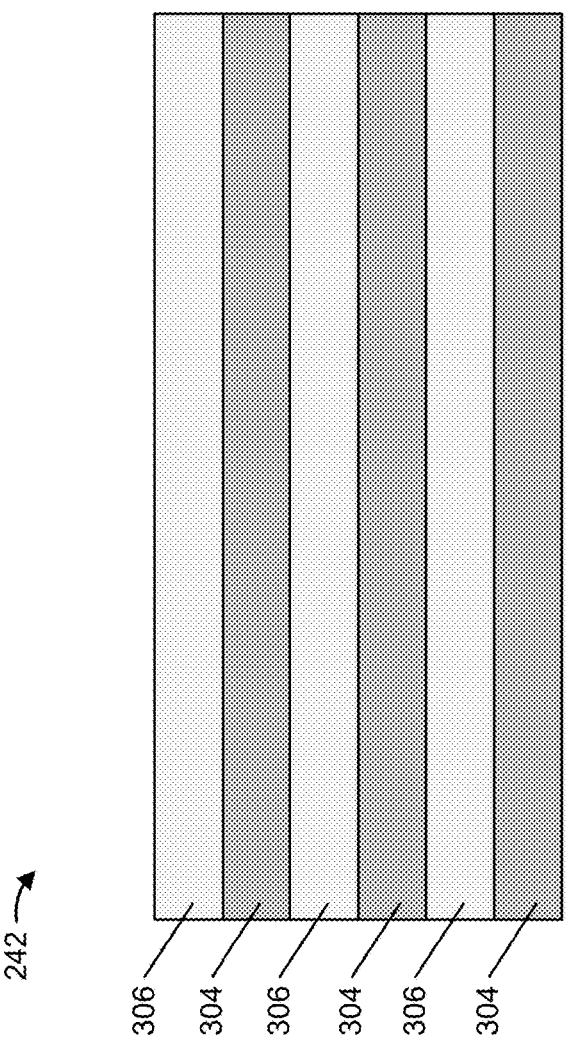

FIGS. 3A and 3B are diagrams of example implementations of the mirror structure 242 described herein. FIG. 3A illustrates an example implementation 300 in which the mirror structure 242 includes a single-layer structure. In the example implementation 300, the mirror structure 242 may include a highly reflective material, such as aluminum copper (AlCu) and/or tungsten (W), among other examples. In some implementations, a dimension D3 corresponding to a thickness of the mirror structure 242 may be included in a range of approximately 5 angstroms to approximately 1 micron. If the dimension D3 is less than approximately 5 angstroms, the mirror structure 242 may not provide sufficient reflectivity, which may result in increased optical loss for the modulated optical signal 224. If the dimension D3 is greater than approximately 1 micron, the mirror structure 242 may experience increased surface roughness, which may also increase optical loss for the modulated optical signal 224. If the dimension D3 is included in the range of approximately 5 angstroms to approximately 1 micron, a high reflectivity and low surface roughness for the mirror structure 242 may be achieved, resulting in reduced or minimized optical loss for the modulated optical signal 224. However, other values for the dimension D3, and ranges other than approximately 5 angstroms to approximately 1 micron, are within the scope of the present disclosure.

FIG. 3B illustrates an example implementation 302 in which the mirror structure 242 includes a multiple-layer structure. For example, the mirror structure 242 may include a plurality of first layers 304 that are vertically arranged with a plurality of second layers 306 in an alternating manner. In other words, the first layers 304 alternate with the second layers 306 in a direction that is approximately perpendicular to a direction in which the mirror structure 242 extends. In some implementations, one or more properties of the plurality of first layers 304 and/or one or more properties of the plurality of second layers 306 may be selected to optimize the reflectivity of the mirror structure 242 for the modulated optical signal 224. For example, the refractive indices of the first layers 304 and/or the refractive indices of the second layers 306 may be different and may be selected to optimize the reflectivity of the mirror structure 242 for the modulated optical signal 224. In other words, each of the first layers 304 may have a first refractive index, each of the second layers 306 may have a second refractive index, and the first refractive index and the second refractive index may be different refractive indices and may be selected to optimize the reflectivity of the mirror structure 242 for the modulated optical signal 224.

As another example, the thicknesses of the first layers 304 and/or the thicknesses of the second layers 306 may be different and may be selected to optimize the reflectivity of the mirror structure 242 for the modulated optical signal 224. In other words, each of the first layers 304 may have a first thickness (e.g., individual thicknesses for each first layer 304), each of the second layers 306 may have a second thickness (e.g., individual thicknesses for each second layer 306), and the first thickness and the second thickness may be different thicknesses and may be selected to optimize the reflectivity of the mirror structure 242 for the modulated optical signal 224.

As another example, the first layers 304 may each include a first material, and the second layers 306 may each include a second material, where the first material and the second material are selected to optimize the reflectivity of the mirror structure 242 for the modulated optical signal 224. As an example, the first material may include silicon (Si) and the second material may include molybdenum (Mo).

As indicated above, FIGS. 3A and 3B are provided as examples. Other examples may differ from what is described with regard to FIGS. 3A and 3B.

Figure 4A:
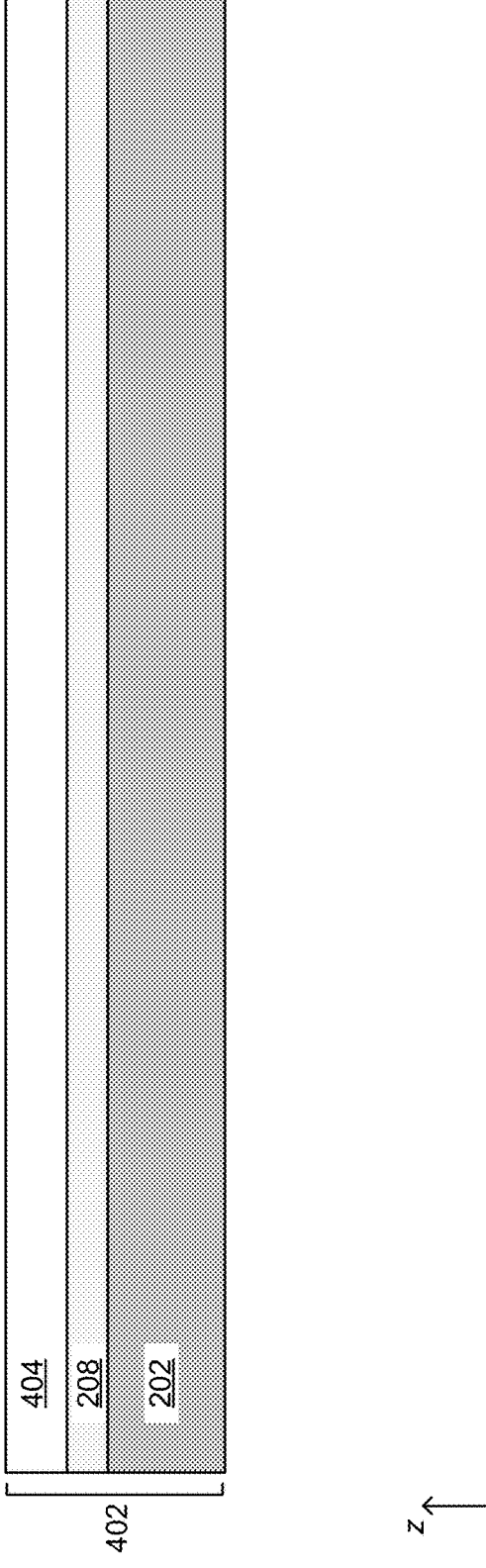
FIGS. 4A-4Q are diagrams of an example implementation of forming a semiconductor photonics device described herein.
Figure 4B:
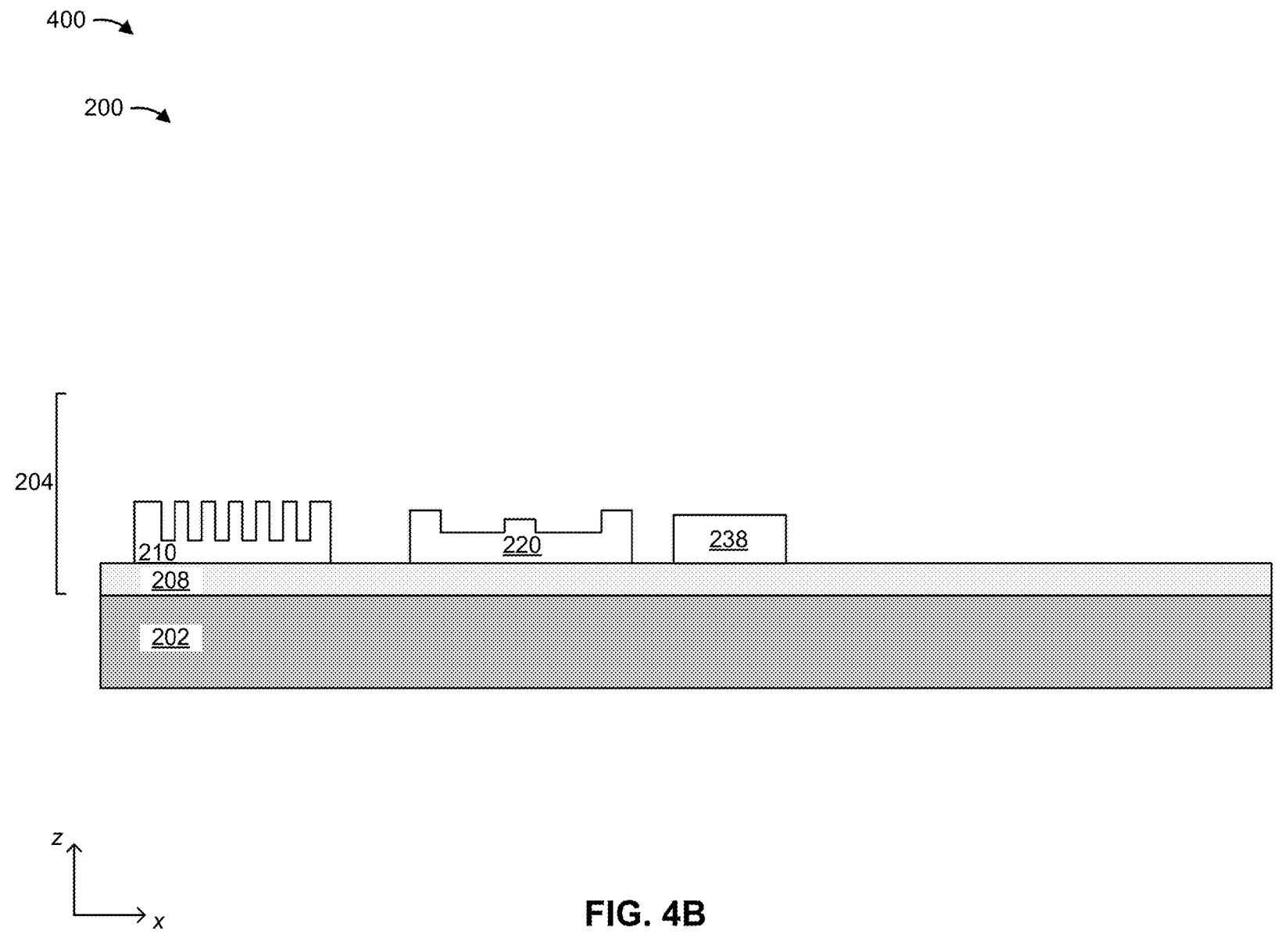
Figure 4C:
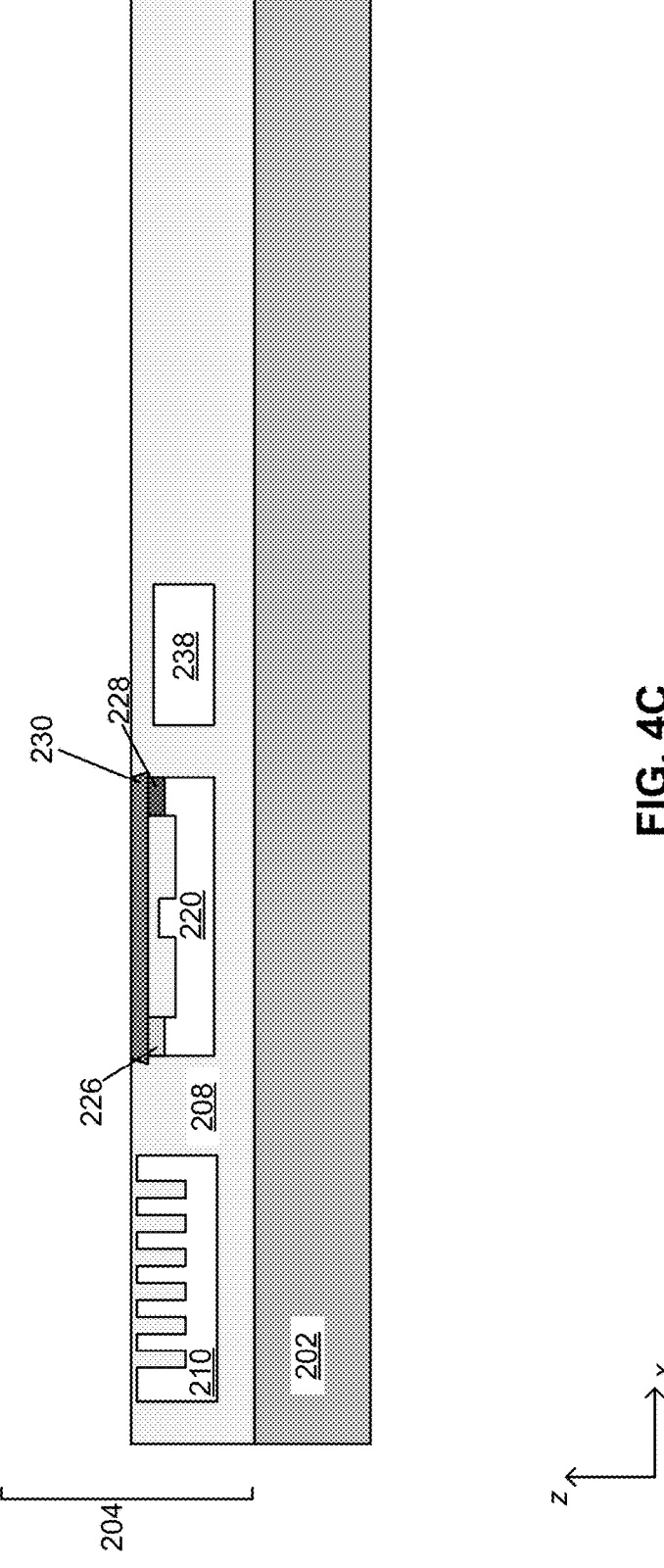
Figure 4D:
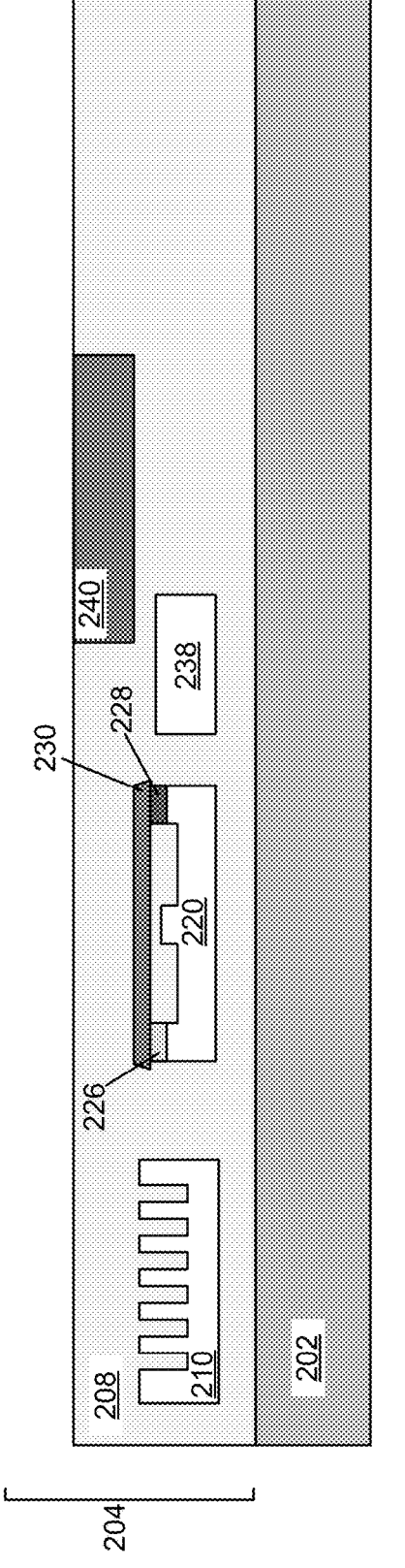
Figure 4E:
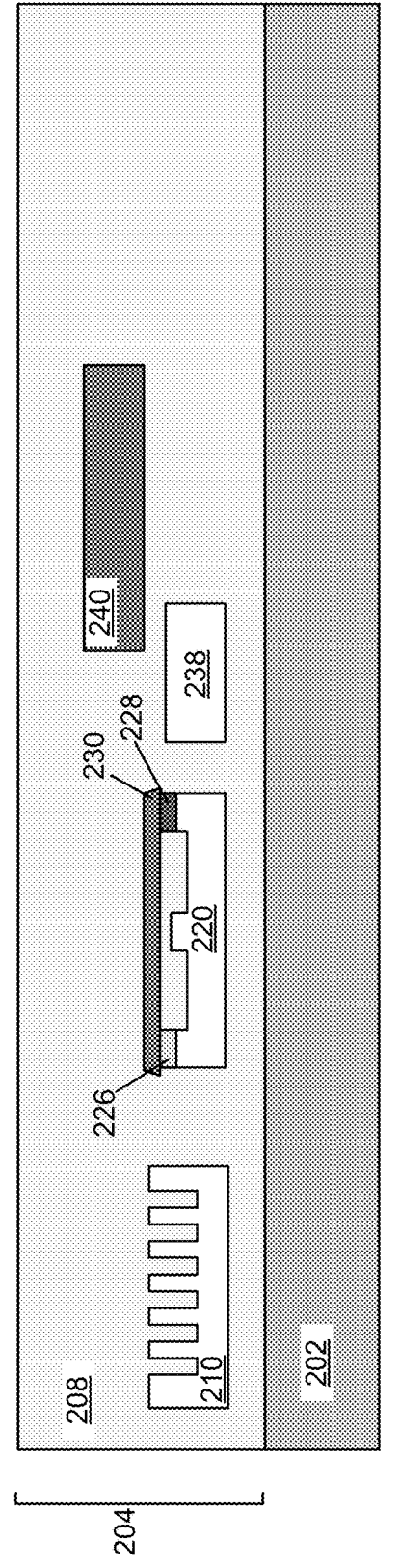
Figure 4F:
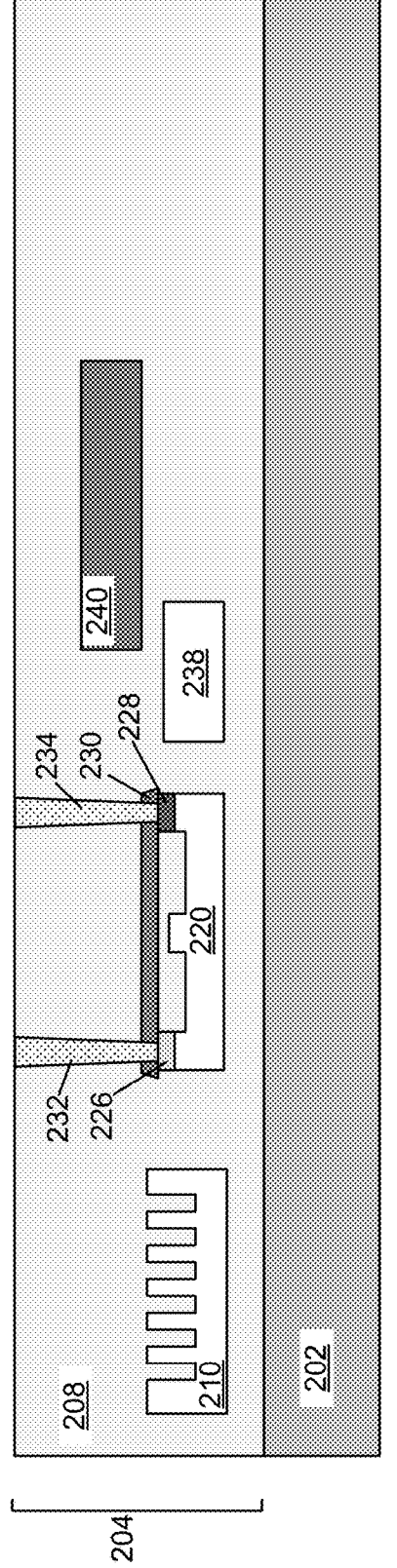
Figure 4G:
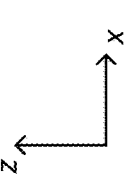
Figure 4H:
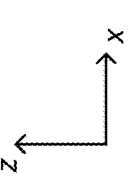
Figure 40:
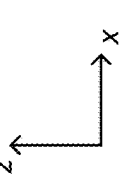
Figure 4P:
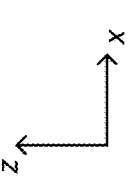
Figure 4Q:
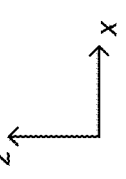

FIGS. 4A-4Q are diagrams of an example implementation 400 of forming the semiconductor photonics device 200 described herein. In some implementations, one or more of the semiconductor processing operations described in connection with the example implementation 400 may be performed using one or more of the semiconductor processing tools 102-114 and/or by the wafer/die transport tool 116. In some implementations, one or more of the semiconductor processing operations described in connection with the example implementation 400 may be performed using another semiconductor processing tool.

Turning to FIG. 4A, a substrate 402 may be provided. The substrate 402 may include a silicon on insulator (SOI) substrate (or SOI wafer) that includes the semiconductor substrate 202 (e.g., a silicon (Si) substrate and/or another type of semiconductor substrate), a portion of the dielectric region 208 (e.g., a buried oxide or bottom oxide (BOX) layer and/or another type of insulator layer) over and/or on the semiconductor substrate 202, and a semiconductor layer 404

(e.g., a silicon (Si) layer and/or another type of semiconductor layer) over and/or on the portion of the dielectric region 208.

Alternatively, the semiconductor substrate 202 may be provided as a semiconductor wafer, and a deposition tool 102 may be used to form the portion of the dielectric region 208 over and/or on the semiconductor substrate 202, and may form the semiconductor layer 404 over and/or on the portion of the dielectric region 208. A deposition tool 102 may be used to form the portion of the dielectric region 208 using a CVD technique, a PVD technique, an oxidation technique (e.g., a thermal oxidation technique), and/or another type of deposition technique. A deposition tool 102 may be used to form the semiconductor layer 404 using a CVD technique, a PVD technique, an epitaxy technique, and/or another type of deposition technique.

As shown in FIGS. 4B-4F, the device region 204 of the semiconductor device 200 is formed. As shown in FIG. 4B, the grating coupler 210, the optical modulator 220, and the semiconductor waveguide 238 may be formed in the semiconductor layer 404. In some implementations, a pattern in a hard mask layer is used to etch the semiconductor layer 404 to form the grating coupler 210, the optical modulator 220, and/or the semiconductor waveguide 238. For example, a deposition tool 102 may be used to form the hard mask layer on the semiconductor layer 404 (e.g., using a CVD technique, a PVD technique, and/or another type of deposition technique), and may be used to form a photoresist layer on the hard mask layer (e.g., using a spin-coating technique and/or another type of deposition technique). An exposure tool 104 may be used to expose the photoresist layer to a radiation source to form a pattern the photoresist layer. A developer tool 106 may be used to develop and remove portions of the photoresist layer to expose the pattern. An etch tool 108 may be used to etch the hard mask layer to transfer the pattern from the photoresist layer to the hard mask layer.

An etch tool 108 may be used to etch the semiconductor layer 404 based on the pattern in the hard mask layer to form the grating coupler 210, the optical modulator 220, and/or the semiconductor waveguide 238 by removing portions of the semiconductor layer 404 based on the pattern. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a planarization tool 110 is used to remove the remaining portions of the hard mask layer using a CMP technique and/or another type of planarization technique.

As shown in FIG. 4C, additional material for the dielectric region 208 may be deposited to encapsulate the grating coupler 210, the optical modulator 220, and the semiconductor waveguide 238 in the dielectric region 208. A deposition tool 102 may be used to deposit the additional material for the dielectric region 208 using a CVD technique, a PVD technique, an oxidation technique (e.g., a thermal oxidation technique), and/or another type of deposition technique. In some implementations, a planarization tool 110 is used to planarize the dielectric region 208 after the additional material of the dielectric region 208 is deposited.

As further shown in FIG. 4C, one or more portions of the optical modulator 220 may be doped with one or more types of dopants to form one or more doped regions in the optical modulator 220, including the contacts 226 and 228. For example, an ion implantation tool 114 may be used to implant a portion of the semiconductor material of the optical modulator 220 with p-type ions to form the contact 226. As another example, an ion implantation tool 114 may be used to implant another portion of the semiconductor material of the optical modulator 220 with n-type ions to form the contact 228. The p-type ions and/or the n-type ions may be implanted using an ion implantation technique and/or another type of doping technique.

As further shown in FIG. 4C, the capping layer 230 may be formed over and/or on the top surface of the contacts 226 and 228. A deposition tool 102 may be used to deposit the capping layer 230 using a CVD technique, a PVD technique, an ALD technique, an oxidation technique, and/or another deposition technique. In some implementations, a planarization tool 110 is used to planarize the capping layer 230 such that the top surface of the dielectric region 208 and the top surface of the capping layer 230 are coplanar.

As shown in FIG. 4D, additional material of the dielectric region 208 may be formed over and/or on the grating coupler 210, the optical modulator 220, and/or the semiconductor waveguide 238. A deposition tool 102 may be used to deposit the additional material for the dielectric region 208 using a CVD technique, a PVD technique, an oxidation technique (e.g., a thermal oxidation technique), and/or another type of deposition technique. In some implementations, a planarization tool 110 is used to planarize the dielectric region 208 after the additional material of the dielectric region 208 is deposited.

As further shown in FIG. 4D, the dielectric waveguide 240 may be formed in dielectric region 208 above the semiconductor waveguide 238. The dielectric waveguide 240 may be formed in a recess in the dielectric region 208.

In some implementations, a pattern in a photoresist layer is used to etch the dielectric region 208 to form a recess in the dielectric region 208. In these implementations, a deposition tool 102 may be used to form the photoresist layer on the dielectric region 208. An exposure tool 104 may be used to expose the photoresist layer to a radiation source to pattern the photoresist layer. A developer tool 106 may be used to develop and remove portions of the photoresist layer to expose the pattern. An etch tool 108 may be used to etch the dielectric region 208 based on the pattern to form the recess in the dielectric region 208. In some implementations, the etch operation includes a plasma etch operation, a wet chemical etch operation, and/or another type of etch operation. In some implementations, a photoresist removal tool may be used to remove the remaining portions of the photoresist layer (e.g., using a chemical stripper, plasma ashing, and/or another technique). In some implementations, a hard mask layer is used as an alternative technique for etching the dielectric region 208 based on a pattern.

A deposition tool 102 may be used to deposit the dielectric waveguide 240 in the recess in the dielectric region 208 using a CVD technique, a PVD technique, an oxidation technique (e.g., a thermal oxidation technique), and/or another type of deposition technique. In some implementations, a planarization tool 110 is used to planarize the dielectric waveguide 240 after the dielectric waveguide 240 is deposited.

As shown in FIG. 4E, additional material of the dielectric region 208 may be formed over and/or on the grating coupler 210, the optical modulator 220, the semiconductor waveguide 238, and/or the dielectric waveguide 240. A deposition tool 102 may be used to deposit the additional material for the dielectric region 208 using a CVD technique, a PVD technique, an oxidation technique (e.g., a thermal oxidation technique), and/or another type of deposition technique. In some implementations, a planarization tool 110 is used to planarize the dielectric region 208 after the additional material of the dielectric region 208 is deposited.

As further shown in FIG. 4F, the interconnect structures 232 and 234 may be formed in dielectric region 208 over the optical modulator 220. The interconnect structure 232 may be formed over and/or on the contact 226 such that the interconnect structure 232 is electrically coupled and/or physically coupled with the contact 226. The interconnect structure 234 may be formed over and/or on the contact 228 such that the interconnect structure 234 is electrically coupled and/or physically coupled with the contact 228. The interconnect structures 232 and 234 may be formed in recesses in the dielectric region 208.

In some implementations, a pattern in a photoresist layer is used to etch the dielectric region 208 and the capping layer 230 to form the recesses in the dielectric region 208. In these implementations, a deposition tool 102 may be used to form the photoresist layer on the dielectric region 208. An exposure tool 104 may be used to expose the photoresist layer to a radiation source to pattern the photoresist layer. A developer tool 106 may be used to develop and remove portions of the photoresist layer to expose the pattern. An etch tool 108 may be used to etch the dielectric region 208 and the capping layer 230 based on the pattern to form the recesses in the dielectric region 208. In some implementations, the etch operation includes a plasma etch operation, a wet chemical etch operation, and/or another type of etch operation. In some implementations, a photoresist removal tool may be used to remove the remaining portions of the photoresist layer (e.g., using a chemical stripper, plasma ashing, and/or another technique). In some implementations, a hard mask layer is used as an alternative technique for etching the dielectric region 208 based on a pattern.

A deposition tool 102 and/or a plating tool 112 may be used to deposit the interconnect structures 232 and 234 in the recesses using a CVD technique, a PVD technique, an ALD technique, an electroplating technique, another deposition technique described above in connection with FIG. 1, and/or another suitable deposition technique. In some implementations, a seed layer is first deposited, and the interconnect structure 232 and/or the interconnect structure 234 is deposited on the seed layer. In some implementations, a planarization tool 110 may be used to planarize the interconnect structure 232 and/or the interconnect structure 234 after the interconnect structure 232 and/or the interconnect structure 234 is deposited.

The interconnect structure 232 may be deposited such that the interconnect structure 232 lands on the contact 226. The interconnect structure 234 may be deposited such that the interconnect structure 234 lands on the contact 228. In some implementations, a silicide layer is formed on the contact 226, and the interconnect structure 232 is formed on the silicide layer. In some implementations, a silicide layer is formed on the contact 228, and the interconnect structure 234 is formed on the silicide layer.

As shown in FIG. 4G, the interconnect region 206 may be formed over the device region 204. The interconnect region 206 may be formed in a sequence of operations in which one or more of the dielectric layers 216 are formed, and one or more of the metallization layers 236 are formed in the one or more of the dielectric layers 216. For example, a first dielectric layer of the dielectric layers 216 may be deposited, patterned, and etched. A first metallization layer of the metallization layers 236 may then be deposited in the first dielectric layer. A second dielectric layer of the dielectric layers 216 may be deposited over the first dielectric layer, patterned, and etched. A second metallization layer of the metallization layers 236 may then be deposited in the second dielectric layer. Additional dielectric layers 216 and additional metallization layers 236 may be formed in the interconnect region 206 in a similar manner. The passivation layer 218 may be formed over the topmost dielectric layer of the dielectric layers 216.

A deposition tool 102 may be used to deposit the dielectric layers 216 using a PVD technique, an ALD technique, a CVD technique, an oxidation technique, another type of deposition technique described in connection with FIG. 1, and/or another suitable deposition technique. In some implementations, a planarization tool 110 may be used to planarize the dielectric layers 216 after the dielectric layers 216 are deposited.

A deposition tool 102 and/or a plating tool 112 may be used to deposit the metallization layers 236 using a CVD technique, a PVD technique, an ALD technique, an electroplating technique, another deposition technique described above in connection with FIG. 1, and/or another suitable deposition technique. In some implementations, a seed layer is first deposited, and the metallization layers 236 are deposited on the seed layer. In some implementations, a planarization tool 110 may be used to planarize the metallization layers 236 after the metallization layers 236 are deposited.

A deposition tool 102 may be used to deposit the passivation layer 218 using a PVD technique, an ALD technique, a CVD technique, an oxidation technique, another type of deposition technique described in connection with FIG. 1, and/or another suitable deposition technique. In some implementations, a planarization tool 110 may be used to planarize the passivation layer 218 after the passivation layer 218 is deposited.

As shown in FIGS. 4H and 4I, a recess 406 may be formed through the passivation layer 218, through the one or more dielectric layers 216 of the interconnect region 206, and through the dielectric region 208 of the device region 204. The recess 406 may be formed adjacent to the dielectric waveguide 240. A portion of the semiconductor substrate 202 may be exposed through the recess 406.

In some implementations, a pattern in a photoresist layer is used to etch the passivation layer 218, the one or more dielectric layers 216, the dielectric region 208 to form the recess 406. In these implementations, a deposition tool 102 may be used to form the photoresist layer on the passivation layer 218. An exposure tool 104 may be used to expose the photoresist layer to a radiation source to pattern the photoresist layer. A developer tool 106 may be used to develop and remove portions of the photoresist layer to expose the pattern. An etch tool 108 may be used to etch the passivation layer 218, the one or more dielectric layers 216, the dielectric region 208 based on the pattern to form the recess 406 through in the passivation layer 218, the one or more dielectric layers 216, the dielectric region 208. In some implementations, the etch operation includes a plasma etch operation, a wet chemical etch operation, and/or another type of etch operation. In some implementations, a photoresist removal tool may be used to remove the remaining portions of the photoresist layer (e.g., using a chemical stripper, plasma ashing, and/or another technique). In some implementations, a hard mask layer is used as an alternative technique for etching the passivation layer 218, the one or more dielectric layers 216, the dielectric region 208 based on a pattern.

As shown in FIG. 4J, the semiconductor support structure 246 may be formed in the recess 406. The semiconductor support structure 246 may be formed on the portion of the semiconductor substrate 202 that is exposed through the recess 406. Thus, the semiconductor support structure 246 may extend above the semiconductor substrate 202.

A deposition tool 102 may be used to epitaxially grow the semiconductor support structure 246 on the semiconductor substrate 202 in the recess 406. Epitaxially growing the semiconductor support structure 246 enables the semiconductor support structure 246 to be formed such that the semiconductor support structure 246 has a particular crystal grain orientation. In particular, epitaxially growing the semiconductor support structure 246 enables the semiconductor support structure 246 to be formed such that the semiconductor support structure 246 has a (011) crystal grain orientation. As shown in FIG. 4J, epitaxially growing the semiconductor support structure 246 such that the semiconductor support structure 246 has a (011) crystal grain orientation facilitates formation of the angled sidewalls 248 of the semiconductor support structure 246. Thus, the semiconductor support structure 246 is formed to a trapezoidal cross-sectional profile (e.g., in the x-z plane) due to the epitaxial growth of the (011) crystal grain of the semiconductor support structure 246. In this way, the epitaxial growth of the (011) crystal grain of the semiconductor support structure 246 enables the angled sidewalls 248 of the semiconductor support structure 246 to be formed to an angle (dimension D1) that is included in a range of approximately 40 degrees to approximately 50 degrees.

As shown in FIG. 4K, an oxide barrier layer 408 may be formed in the recess 406. The oxide barrier layer 408 may be conformally deposited on the semiconductor support structure 246 such that the oxide barrier layer 408 conforms to the profile and/or the contours of the semiconductor support structure 246. A deposition tool 102 may be used to deposit the oxide barrier layer 408 using a PVD technique, an ALD technique, a CVD technique, an oxidation technique, another type of deposition technique described in connection with FIG. 1, and/or another suitable deposition technique. In some implementations, the oxide barrier layer 408 includes an oxide-containing dielectric material such as silicon oxide ($SiO_x$) or a silicon oxynitride (SiON), among other examples. Additionally, and/or alternatively, the oxide barrier layer 408 may include a nitride-containing dielectric material such as a silicon nitride ($Si_xN_y$), among other examples.

As shown in FIG. 4L, a mirror layer 410 may be formed in the recess 406. The mirror layer 410 may be conformally deposited on the oxide barrier layer 408 over the semiconductor support structure 246 such that the mirror layer 410 conforms to the profile and/or the contours of the semiconductor support structure 246. The mirror layer 410 may also be formed on the sidewalls of the recess 406.

The mirror layer 410 may include one or more a highly reflective materials, such as aluminum copper (AlCu) and/or tungsten (W), among other examples. In some implementations, the mirror layer 410 includes a single layer of highly reflective material. In some implementations, the mirror layer 410 includes a plurality of first layers 304 that are vertically arranged with a plurality of second layers 306 in an alternating manner. The first layers 304 may include a first material (e.g., silicon (Si)) and the second layers 306 may include a second material (e.g., molybdenum (Mo)).

A deposition tool 102 and/or a plating tool 112 may be used to deposit the mirror layer 410 using a CVD technique, a PVD technique, an ALD technique, an electroplating technique, an epitaxy technique, another deposition operation described above in connection with FIG. 1, and/or another suitable deposition operation.

As shown in FIG. 4M, the mirror structure 242 may be formed over the oxide barrier layer 408 on an angled sidewall 248 of the semiconductor support structure 246. Thus, the oxide barrier layer 408 may be included between the mirror structure 242 and the semiconductor support structure 246 such that the mirror structure 242 is spaced apart from the semiconductor support structure 246 by the oxide barrier layer 408. The mirror structure 242 may be formed over the oxide barrier layer 408 on the angled sidewall 248 that is facing the dielectric waveguide 240. The mirror structure 242 may be formed of one or more electrically conductive materials. The oxide barrier layer 408 may be included over the semiconductor support structure 246 to electrically isolate the mirror structure 242 and the semiconductor support structure 246 to prevent (or to reduce the likelihood of) the mirror structure 242 from generating an electric field in the semiconductor support structure 246 (which might otherwise result in current leakage through the semiconductor support structure 246).

The mirror structure 242 may be formed by removing portions of the mirror layer 410, where remaining portions of the mirror layer 410 correspond to the mirror structure 242. In some implementations, a pattern in a photoresist layer is used to etch the mirror layer 410 to form the mirror structure 242. In these implementations, A deposition tool 102 may be used to form the photoresist layer on the mirror layer 410. An exposure tool 104 may be used to expose the photoresist layer to a radiation source to pattern the photoresist layer. A developer tool 106 may be used to develop and remove portions of the photoresist layer to expose the pattern. An etch tool 108 may be used to etch the mirror layer 410 based on the pattern to form the mirror structure 242 from the mirror layer 410. In some implementations, the etch operation includes a plasma etch operation, a wet chemical etch operation, and/or another type of etch operation. In some implementations, a photoresist removal tool may be used to remove the remaining portions of the photoresist layer (e.g., using a chemical stripper, plasma ashing, and/or another technique). In some implementations, a hard mask layer is used as an alternative technique for etching the mirror layer 410 based on a pattern.

As shown in FIGS. 4N and 4O, the recess 406 may be filled with a dielectric material over the semiconductor support structure 246 and over the mirror structure 242. The dielectric material may correspond to additional portions of the dielectric region 208 of the device region 204 and/or additional portions of the one or more dielectric layers 216 of the interconnect region 206. A deposition tool 102 may be used to deposit the dielectric material using a PVD technique, an ALD technique, a CVD technique, an oxidation technique, another type of deposition technique described in connection with FIG. 1, and/or another suitable deposition technique. In some implementations, a planarization tool 110 may be used to planarize the dielectric material after the dielectric material is deposited.

As shown in FIG. 4P, recesses 412 and 414 may be formed in and/or through the one or more dielectric layers 216 of the interconnect region 206 of the semiconductor photonics device 200. The recess 412 may be formed above the grating coupler 210, and the recess 414 may be formed above the mirror structure 242. In some implementations, the recesses 412 and 414 are formed fully through the one or more dielectric layers 216 such that the dielectric region 208 is exposed through the recesses 412 and 414. In some implementations, one or more dielectric layers 216 remain in the recess 412 and/or in the recess 414.

In some implementations, a pattern in a photoresist layer is used to etch the one or more dielectric layers 216 to form the recesses 412 and 414. In these implementations, the deposition tool 102 may be used to form the photoresist layer on the passivation layer 218. The exposure tool 104 may be used to expose the photoresist layer to a radiation source to pattern the photoresist layer. The developer tool 106 may be used to develop and remove portions of the photoresist layer to expose the pattern. The etch tool 108 may be used to etch the passivation layer 218 and the one or more dielectric layers 216 based on the pattern to form the recesses 412 and 414 in the interconnect region 206. In some implementations, the etch operation includes a plasma etch operation, a wet chemical etch operation, and/or another type of etch operation. In some implementations, a photoresist removal tool may be used to remove the remaining portions of the photoresist layer (e.g., using a chemical stripper, plasma ashing, and/or another technique). In some implementations, a hard mask layer is used as an alternative technique for etching the passivation layer 218 and the one or more dielectric layers 216 based on a pattern.

As shown in FIG. 4Q, the input optical fiber 214 may be inserted into the recess 412 such that the input optical fiber 214 is coupled with the top surface of the semiconductor photonics device 200. The input optical fiber 214 extends into the interconnect region 206 of the semiconductor photonics device 200 and is located above the grating coupler 210. This enables input optical signals 212 to be provided to the grating coupler 210 from the input optical fiber 214. In some implementations, the input optical fiber 214 is secured in the recess 412 with an adhesive such as an epoxy.

As further shown in FIG. 4Q, the output optical fiber 244 may be inserted into the recess 414 such that the output optical fiber 244 is coupled with the top surface of the semiconductor photonics device 200. The output optical fiber 244 extends into the interconnect region 206 of the semiconductor photonics device 200 and is located above the mirror structure 242. This enables modulated optical signals 224 to be redirected from the dielectric waveguide 240 to the output optical fiber 244 by the mirror structure 242. In some implementations, the output optical fiber 244 is secured in the recess 414 with an adhesive such as an epoxy.

As indicated above, FIGS. 4A-4Q are provided as an example. Other examples may differ from what is described with regard to FIGS. 4A-4Q.

Figure 5:
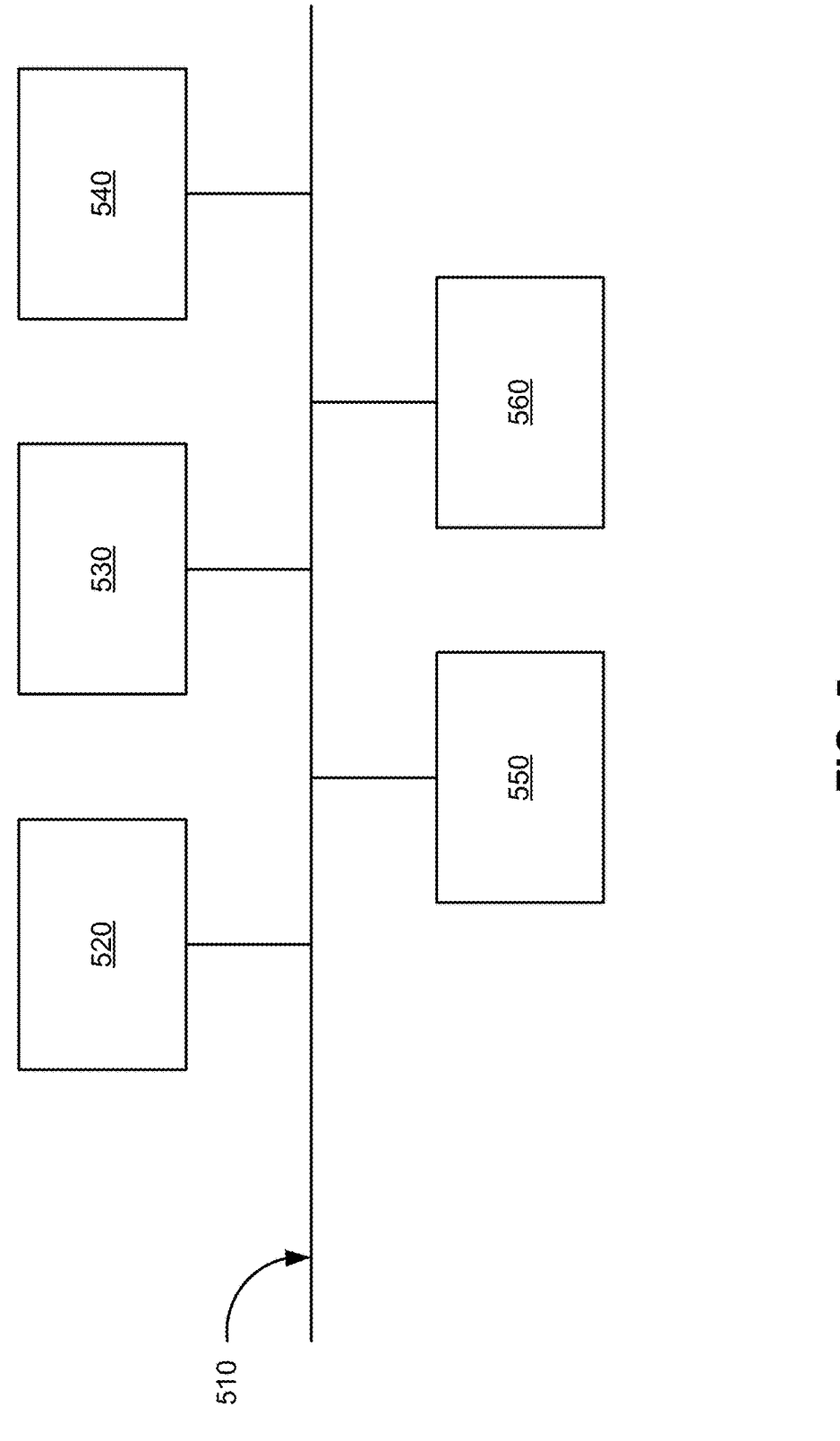
FIG. 5 is a diagram of example components of a device described herein.

FIG. 5 is a diagram of example components of a device 500 described herein. In some implementations, one or more of the semiconductor processing tools 102-114 and/or the wafer/die transport tool 116 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device

500 may perform one or more functions described as being performed by another set of components of the device 500.

FIG. 6 is a flowchart of an example process 600 associated with forming a semiconductor photonics device described herein. In some implementations, one or more process blocks of FIG. 6 are performed using one or more semiconductor processing tools (e.g., one or more of the semiconductor processing tools 102-114). Additionally, or alternatively, one or more process blocks of FIG. 6 may be performed using one or more components of device 500, such as processor 520, memory 530, input component 540, output component 550, and/or communication component 560.

As shown in FIG. 6, process 600 may include forming, in a semiconductor layer above a first portion of a dielectric region, an optical modulator and a first waveguide of a semiconductor photonics device (block 610). For example, one or more of the semiconductor processing tools 102-114 may be used to form, in a semiconductor layer 404 above a first portion of a dielectric region 208, an optical modulator 220 and a first waveguide (e.g., a semiconductor waveguide 238) of a semiconductor photonics device 200, as described herein. In some implementations, a grating coupler 210 is also formed in the semiconductor layer 404.

As further shown in FIG. 6, process 600 may include forming, in a second portion of the dielectric region, a second waveguide of the semiconductor photonics device above the first waveguide (block 620). For example, one or more of the semiconductor processing tools 102-114 may be used to form, in a second portion of the dielectric region 208, a second waveguide (e.g., a dielectric waveguide 240) of the semiconductor photonics device 200 above the first waveguide, as described herein.

As further shown in FIG. 6, process 600 may include forming a recess in the dielectric region adjacent to the second waveguide (block 630). For example, one or more of the semiconductor processing tools 102-114 may be used to form a recess 406 in the dielectric region 208 adjacent to the second waveguide, as described herein. In some implementations, a portion of a semiconductor substrate 202 below the dielectric region 208 is exposed through the recess 406.

As further shown in FIG. 6, process 600 may include forming a semiconductor support structure on the portion of the semiconductor substrate in the recess (block 640). For example, one or more of the semiconductor processing tools 102-114 may be used to form a semiconductor support structure 246 on the portion of the semiconductor substrate 202 in the recess 406, as described herein.

As further shown in FIG. 6, process 600 may include forming a mirror structure over an angled sidewall of the semiconductor support structure (block 650). For example, one or more of the semiconductor processing tools 102-114 may be used to form a mirror structure 242 over an angled sidewall 248 of the semiconductor support structure 246, as described herein.

As further shown in FIG. 6, process 600 may include filling the recess with a dielectric material over the semiconductor support structure and over the mirror structure (block 660). For example, one or more of the semiconductor processing tools 102-114 may be used to fill the recess 406 with a dielectric material over the semiconductor support structure 246 and over the mirror structure 242, as described herein.

Process 600 may include additional implementations, such as any single implementation or any combination of implementations described below and/or in connection with one or more other processes described elsewhere herein.

In a first implementation, process 600 includes forming an oxide barrier layer 408 on the angled sidewall 248 of the semiconductor support structure.

In a second implementation, alone or in combination with the first implementation, forming the mirror structure 242 includes forming the mirror structure 242 on the oxide barrier layer 408 over the angled sidewall 248 of the semiconductor support structure 246.

In a third implementation, alone or in combination with one or more of the first and second implementations, forming the semiconductor support structure 246 includes epitaxially growing the semiconductor support structure 246 on the portion of the semiconductor substrate 202 that is exposed through the recess 406.

In a fourth implementation, alone or in combination with one or more of the first through third implementations, forming the semiconductor support structure 246 includes forming the semiconductor support structure 246 such that the semiconductor support structure 246 has a trapezoidal cross-sectional profile.

In a fifth implementation, alone or in combination with one or more of the first through fourth implementations, forming the semiconductor support structure 246 includes forming the semiconductor support structure 246 such that the semiconductor support structure 246 has a (011) crystal grain orientation.

In a sixth implementation, alone or in combination with one or more of the first through fifth implementations, forming the semiconductor support structure 246 includes forming the semiconductor support structure 246 such that an angle (dimension D1) of the angled sidewall 248, relative to a top surface 250 of the semiconductor substrate 202, is included in a range of approximately 40 degrees to approximately 50 degrees.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

In this way, a semiconductor photonics device may include a photonic integrated circuit and may be coupled with an output optical fiber at a top surface of the semiconductor photonics device. To facilitate coupling of modulated optical signals to the output optical fiber at the top surface of the semiconductor photonics device, the semiconductor photonics device may include a mirror structure that is supported by a semiconductor support structure included in the semiconductor photonics device. The mirror structure may be positioned at an angle relative to a surface of a semiconductor substrate of the semiconductor photonics device, which enables the mirror structure to transfer a modulated optical signal propagating in a first direction to a second direction toward the output optical fiber. Coupling the output optical fiber to the top surface of the semiconductor photonics device, as opposed to coupling the output optical fiber to a side of the semiconductor photonics device, enables wafer-level testing for the semiconductor photonics device. Moreover, propagation distances for modulated optical signals in the semiconductor photonics device may be reduced by coupling the output optical fiber to the top surface of the semiconductor photonics device.

As described in greater detail above, some implementations described herein provide a semiconductor photonics device. The semiconductor photonics device includes a semiconductor substrate. The semiconductor photonics device includes a dielectric region above the semiconductor substrate. The semiconductor photonics device includes an optical modulator in the dielectric region. The semiconductor photonics device includes one or more waveguides in the dielectric region, where the one or more waveguides are optically coupled with the optical modulator. The semiconductor photonics device includes a mirror structure, in the dielectric region, configured to receive a modulated optical signal from the one or more waveguides, where the mirror structure is configured to redirect the modulated optical signal from a first direction, that is approximately parallel with a top surface of the semiconductor substrate, to a second direction that is approximately perpendicular to the first direction. The semiconductor photonics device includes a grating coupler configured to direct an input optical signal from the second direction to the first direction.

As described in greater detail above, some implementations described herein provide a semiconductor photonics device. The semiconductor photonics device includes a semiconductor substrate. The semiconductor photonics device includes a dielectric region above the semiconductor substrate. The semiconductor photonics device includes an optical modulator in the dielectric region. The semiconductor photonics device includes one or more waveguides in the dielectric region, where the one or more waveguides are optically coupled with the optical modulator. The semiconductor photonics device includes a semiconductor support structure on the semiconductor substrate and in the dielectric region. The semiconductor photonics device includes a mirror structure, over the semiconductor support structure in the dielectric region, configured to receive a modulated optical signal from the one or more waveguides, where the mirror structure is configured to redirect the modulated optical signal from a first direction, that is approximately parallel with a top surface of the semiconductor substrate, to a second direction that is approximately perpendicular to the first direction. The semiconductor photonics device includes a grating coupler configured to direct an input optical signal from the second direction to the first direction.

As described in greater detail above, some implementations described herein provide a method. The method includes forming, in a semiconductor layer above a first portion of a dielectric region, an optical modulator and a first waveguide of a semiconductor photonics device. The method includes forming, in a second portion of the dielectric region, a second waveguide of the semiconductor photonics device above the first waveguide. The method includes forming a recess in the dielectric region adjacent to the second waveguide, where a portion of a semiconductor substrate below the dielectric region is exposed through the recess. The method includes forming a semiconductor support structure on the portion of the semiconductor substrate in the recess. The method includes forming a mirror structure over an angled sidewall of the semiconductor support structure. The method includes filling the recess with a dielectric material over the semiconductor support structure and over the mirror structure.

As used herein, "satisfying a threshold" may, depending on the context, refer to a value being greater than the threshold, greater than or equal to the threshold, less than the threshold, less than or equal to the threshold, equal to the threshold, and/or not equal to the threshold, depending on the context.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor photonics device, comprising:
a semiconductor substrate;
a dielectric region above the semiconductor substrate;
an optical modulator in the dielectric region;
one or more waveguides in the dielectric region,
    wherein the one or more waveguides are optically coupled with the optical modulator;
a mirror structure, in the dielectric region, configured to receive a modulated optical signal from the one or more waveguides,
    wherein the mirror structure is configured to redirect the modulated optical signal from a first direction, that is approximately parallel with a top surface of the semiconductor substrate, to a second direction that is approximately perpendicular to the first direction; and
a grating coupler configured to direct an input optical signal from the second direction to the first direction.

2. The semiconductor photonics device of claim 1, wherein the mirror structure is configured to direct the modulated optical signal toward an output optical fiber coupled with the semiconductor photonics device.

3. The semiconductor photonics device of claim 1, wherein the one or more waveguides comprise:
a semiconductor waveguide adjacent to the optical modulator; and
a dielectric waveguide adjacent to the mirror structure.

4. The semiconductor photonics device of claim 3, wherein a top surface of the mirror structure is located at a higher second direction location in the dielectric region than a top surface of the dielectric waveguide; and
    wherein a bottom surface of the mirror structure is located at a lower second direction location in the dielectric region than a bottom surface of the dielectric waveguide.

5. The semiconductor photonics device of claim 1, wherein an angle of the mirror structure, relative to the top surface of the semiconductor substrate, is included in a range of approximately 40 degrees to approximately 50 degrees.

6. The semiconductor photonics device of claim 1, wherein the mirror structure comprises an aluminum copper (AlCu) mirror structure.

7. The semiconductor photonics device of claim 1, wherein the mirror structure comprises:
a first plurality of layers having a first refractive index; and
a second plurality of layers, alternating with the first plurality of layers, having a second refractive index.

8. The semiconductor photonics device of claim 1, wherein a thickness of the mirror structure is included in a range of approximately 5 angstroms to approximately 1 micron.

9. A semiconductor photonics device, comprising:
a semiconductor substrate;
a dielectric region above the semiconductor substrate;
an optical modulator in the dielectric region;
one or more waveguides in the dielectric region, wherein the one or more waveguides are optically coupled with the optical modulator;
a semiconductor support structure on the semiconductor substrate and in the dielectric region;
a mirror structure, over the semiconductor support structure in the dielectric region, configured to receive a modulated optical signal from the one or more waveguides,
    wherein the mirror structure is configured to redirect the modulated optical signal from a first direction, that is approximately parallel with a top surface of the semiconductor substrate, to a second direction that is approximately perpendicular to the first direction; and
a grating coupler configured to direct an input optical signal from the second direction to the first direction.

10. The semiconductor photonics device of claim 9, wherein the semiconductor support structure has a (011) crystal grain orientation.

11. The semiconductor photonics device of claim 9, wherein the mirror structure is located over an angled sidewall of the semiconductor support structure.

12. The semiconductor photonics device of claim 11, wherein the mirror structure is positioned at an angle relative to the top surface of the semiconductor substrate; and
    wherein the angle of the mirror structure corresponds to an angle of the angled sidewall of the semiconductor support structure.

13. The semiconductor photonics device of claim 9, further comprising:
an oxide barrier layer between the semiconductor support structure and the mirror structure.

14. A method, comprising:
forming, in a semiconductor layer above a first portion of a dielectric region, an optical modulator and a first waveguide of a semiconductor photonics device;
forming, in a second portion of the dielectric region, a second waveguide of the semiconductor photonics device above the first waveguide;
forming a recess in the dielectric region adjacent to the second waveguide,
    wherein a portion of a semiconductor substrate below the dielectric region is exposed through the recess;
forming a semiconductor support structure on the portion of the semiconductor substrate in the recess;
forming a mirror structure over an angled sidewall of the semiconductor support structure; and
filling the recess with a dielectric material over the semiconductor support structure and over the mirror structure.

15. The method of claim 14, further comprising:
forming an oxide barrier layer on the angled sidewall of the semiconductor support structure.

16. The method of claim 15, wherein forming the mirror structure comprises:
forming the mirror structure on the oxide barrier layer over the angled sidewall of the semiconductor support structure.

17. The method of claim 14, wherein forming the semiconductor support structure comprises:
epitaxially growing the semiconductor support structure on the portion of the semiconductor substrate that is exposed through the recess.

18. The method of claim 14, wherein forming the semiconductor support structure comprises:

forming the semiconductor support structure such that the semiconductor support structure has a trapezoidal cross-sectional profile.

19. The method of claim 14, wherein forming the semiconductor support structure comprises:

forming the semiconductor support structure such that the semiconductor support structure has a (011) crystal grain orientation.

20. The method of claim 14, wherein forming the semiconductor support structure comprises:

forming the semiconductor support structure such that an angle of the angled sidewall, relative to a top surface of the semiconductor substrate, is included in a range of approximately 40 degrees to approximately 50 degrees.

\* \* \* \* \*